(12) United States Patent
Salter et al.

(10) Patent No.: US 10,850,711 B2
(45) Date of Patent: Dec. 1, 2020

(54) SYSTEM AND METHODS FOR EXTERIOR VEHICLE DISPLAY AND PANEL EXCITERS

(71) Applicant: Ford Global Technologies, LLC, Dearborn, MI (US)

(72) Inventors: Stuart C. Salter, White Lake, MI (US); Cornel Lewis Gardner, Romulus, MI (US); David Brian Glickman, Southfield, MI (US); Kristopher Karl Brown, Dearborn, MI (US); Joshua Wheeler, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 16/402,644

(22) Filed: May 3, 2019

(65) Prior Publication Data
US 2020/0346625 A1    Nov. 5, 2020

(51) Int. Cl.
| | |
|---|---|
| *B60S 1/56* | (2006.01) |
| *B08B 7/02* | (2006.01) |
| *G01K 1/14* | (2006.01) |
| *B60R 11/02* | (2006.01) |
| *B08B 7/00* | (2006.01) |
| *B60R 11/00* | (2006.01) |

(52) U.S. Cl.
CPC .............. *B60S 1/56* (2013.01); *B08B 7/0071* (2013.01); *B08B 7/026* (2013.01); *B60R 11/0235* (2013.01); *B60R 11/0264* (2013.01); *G01K 1/14* (2013.01); *B60R 2011/004* (2013.01)

(58) Field of Classification Search
None
See application file for complete search history.

(56) References Cited

U.S. PATENT DOCUMENTS

| | | | |
|---|---|---|---|
| 4,768,256 | A | 9/1988 | Motoda |
| 5,012,593 | A | 5/1991 | Okada et al. |
| 5,037,189 | A | 8/1991 | Fujie et al. |
| 5,272,892 | A * | 12/1993 | Janutka .............. D06F 39/087 68/12.02 |
| 5,475,530 | A | 12/1995 | Fujie et al. |
| 5,838,238 | A | 11/1998 | Abita et al. |
| 8,217,554 | B2 | 7/2012 | Royer, Jr. et al. |
| 8,299,907 | B2 | 10/2012 | Vandenbrink et al. |
| 8,410,918 | B1 | 4/2013 | Stroud |

(Continued)

FOREIGN PATENT DOCUMENTS

| | | | |
|---|---|---|---|
| CN | 103978952 A | 8/2014 | |
| DE | 102018211426 A1 * | 1/2020 | ............. B29C 45/14 |

(Continued)

*Primary Examiner* — Lori L Lyjak
(74) *Attorney, Agent, or Firm* — David Coppiellie; Price Heneveld LLP

(57) ABSTRACT

An exterior display apparatus for a vehicle comprises a display panel comprising a display surface in connection with an exterior portion of the vehicle. The system further comprises an acoustic vibration device dynamically coupled to the display surface and a sensor configured to detect a foreign material on a portion of the display screen. A controller is configured to identify a temperature of an environment proximate the vehicle. In response to the detection of the foreign material, the controller is configured to activate a plurality of vibration control routines of the acoustic vibrational device based on the temperature.

20 Claims, 7 Drawing Sheets

(56) References Cited

U.S. PATENT DOCUMENTS

| | | | |
|---|---|---|---|
| 8,537,030 B2 | 9/2013 | Perkins | |
| 8,994,495 B2 * | 3/2015 | Dassanayake | G07C 9/00174 340/5.54 |
| 9,421,909 B2 | 8/2016 | Strickland et al. | |
| 9,676,256 B2 | 6/2017 | Elie et al. | |
| 9,932,944 B2 | 4/2018 | Yang et al. | |
| 10,127,749 B2 | 11/2018 | Schmidt | |
| 10,129,643 B2 | 11/2018 | Lopez et al. | |
| 10,599,260 B1 * | 3/2020 | Salter | B60K 35/00 |
| 2002/0060296 A1 * | 5/2002 | Van Der Veen | G03F 7/70558 250/492.1 |
| 2003/0171859 A1 | 9/2003 | Murakoshi | |
| 2005/0043864 A1 | 2/2005 | Echtenkamp | |
| 2008/0084360 A1 * | 4/2008 | Shingai | G09F 21/04 345/1.3 |
| 2008/0106908 A1 | 5/2008 | Englander | |
| 2008/0114904 A1 | 5/2008 | Kosco | |
| 2008/0273715 A1 | 11/2008 | Snider et al. | |
| 2009/0150242 A1 * | 6/2009 | Del Cogliano | G09F 21/04 705/14.62 |
| 2010/0290639 A1 * | 11/2010 | Snider | H04R 5/02 381/86 |
| 2012/0038568 A1 * | 2/2012 | Colloms | G06F 3/016 345/173 |
| 2013/0135088 A1 | 5/2013 | Simha | |
| 2013/0234844 A1 | 9/2013 | Yopp | |
| 2014/0090280 A1 * | 4/2014 | Cunningham | B60R 25/1001 40/201 |
| 2014/0114612 A1 * | 4/2014 | Yoskovitz | G01N 29/14 702/184 |
| 2014/0266658 A1 | 9/2014 | Feldman | |
| 2015/0035685 A1 | 2/2015 | Strickland et al. | |
| 2015/0161836 A1 * | 6/2015 | Park | B60R 25/2045 340/5.51 |
| 2015/0315839 A1 * | 11/2015 | Shigemoto | B60Q 1/0023 345/173 |
| 2016/0023772 A1 | 1/2016 | Borigo et al. | |
| 2016/0103358 A1 * | 4/2016 | Tanaka | G06F 3/0416 349/12 |
| 2017/0044816 A1 | 2/2017 | Salter et al. | |
| 2017/0213459 A1 * | 7/2017 | Ogaz | G08G 1/166 |
| 2017/0293386 A1 * | 10/2017 | Seder | G06F 3/0443 |
| 2018/0222526 A1 | 8/2018 | Thompson | |
| 2018/0237069 A1 | 8/2018 | Gehin | |
| 2018/0292832 A1 | 10/2018 | Bae et al. | |
| 2018/0312369 A1 | 11/2018 | Blanchard | |
| 2018/0345971 A1 * | 12/2018 | Birnschein | B60L 1/02 |
| 2019/0155450 A1 * | 5/2019 | Kim | G01L 1/26 |
| 2019/0213931 A1 * | 7/2019 | Brubaker | B60Q 1/44 |
| 2019/0248333 A1 * | 8/2019 | Lee | G06K 9/001 |
| 2019/0315270 A1 * | 10/2019 | Ly | G06T 7/70 |
| 2019/0351768 A1 * | 11/2019 | Salter | G06Q 10/02 |
| 2020/0010048 A1 * | 1/2020 | Park | H04W 12/04071 |
| 2020/0068724 A1 * | 2/2020 | Kishimoto | H05K 5/0017 |

FOREIGN PATENT DOCUMENTS

| | | | |
|---|---|---|---|
| EP | 3141929 A1 | 3/2017 | |
| JP | 6477856 B1 * | 3/2019 | G06F 21/048 |
| WO | 2012029056 A2 | 3/2012 | |

* cited by examiner

SYSTEM AND METHODS FOR EXTERIOR VEHICLE DISPLAY AND PANEL EXCITERS

FIELD OF THE DISCLOSURE

The present disclosure generally relates to a display for a vehicle and, more particularly, relates to a display device for an exterior panel or portion of an automotive vehicle.

BACKGROUND OF THE DISCLOSURE

Vehicle accessibility and convenience are of growing importance due to increased competition and consumer expectations. Accessibility features may include vehicle displays and a variety of automated features. Displays and display technologies may be implemented in a variety of ways to communicate visual information. However, in some applications and environments, the performance of conventional displays may be inadequate. Accordingly, novel designs for display devices may provide for improved operation and performance in adverse or various operating conditions. In general, the disclosure provides for novel systems and methods that may be implemented to improve the operation of display devices.

SUMMARY OF THE DISCLOSURE

According to one aspect of the present disclosure, an exterior display apparatus for a vehicle is disclosed. The apparatus comprises a display panel comprising a display surface in connection with an exterior portion of the vehicle. The system further comprises an acoustic vibration device dynamically coupled to the display surface and a sensor configured to detect a foreign material on a portion of the display screen. A controller is configured to identify a temperature of an environment proximate the vehicle. In response to the detection of the foreign material, the controller is configured to activate a plurality of vibration control routines of the acoustic vibrational device based on the temperature.

Embodiments of the first aspect of the disclosure can include any one or a combination of the following features:
  the acoustic vibration device comprises a panel exciter in connection with the display panel;
  the plurality of vibration control routines comprise a first routine, wherein the controller is configured to activate the first routine in response to the temperature above a freezing threshold; and a second routine, wherein the controller is configured to activate the second control routine in response to the temperature below the freezing threshold;
  the first control routine comprises activating the panel exciter at a first frequency;
  the second control routine comprises the controller further configured to activate the panel exciter at a second frequency; update a detection of the foreign material following the activation of the second frequency; and in response to the foreign material detected in the updated detection, activate the panel exciter at a third activation frequency;
  the third frequency is greater than the second frequency;
  a heating apparatus configured to heat at least a portion of the display surface;
  the second control routine comprises the controller further configured to activate the heating apparatus for a predetermined heating duration;
  the controller is configured to identify the predetermined heating duration based on the temperature;
  the controller is further configured to receive an indication from the sensor indicating a change in a signal conducted over at least a portion of the display panel;
  the sensor comprises a touch sensitive user interface configured to detect a user input to the at least one display panel;
  the controller is further configured to detect the foreign material disposed on the display panel in response to a signal from the touch sensitive user interface; and/or
  the at least one panel comprises a first display panel in connection with a first door trim portion; and a second display panel in connection with a second door trim portion adjacent to the first trim portion, wherein each of the display panels comprises a touch sensor and a heater layer distributed over a display surface.

According to another aspect of the present disclosure, a method for controlling a panel exciter for a display panel is disclosed. The method comprises detecting a foreign material on a display surface of the display panel and detecting a temperature of an environment of the display panel. In response to detecting the foreign material and the temperature greater than or equal to a temperature threshold, the method may continue by activating a first control routine comprising activating the panel exciter to a first frequency for a predetermined period of time. In response to detecting the foreign material and the temperature less than the temperature threshold, the method may continue by activating a second control routine comprising activating the panel exciter at a second frequency and updating a detection of the foreign material following the activation of the second frequency. In response to the foreign material detected in the updated detection, the method is configured to activate the panel exciter at a third activation frequency.

The embodiments of the second aspect of the disclosure can include any one or a combination of the following features or steps:
  the temperature threshold indicates a freezing condition of the environment;
  the third frequency is greater than the second frequency;
  the second control routine further comprises heating the display surface for a predetermined heating duration; and/or
  adjusting the predetermined heating duration based on the temperature.

According to yet another aspect of the present disclosure, an exterior display apparatus for a vehicle is disclosed. The apparatus comprises a display panel comprising a display surface and a touch screen interface in connection with an exterior portion of the vehicle. An acoustic vibration device is dynamically coupled to the display surface and a heating apparatus is configured to heat the display surface. An environmental sensor is configured to detect a temperature proximate the vehicle. A controller is configured to detect a foreign material on the display screen based on a signal from the touch screen interface. In response to the detection of the foreign material and the temperature above or equal to a predetermined threshold, the controller is configured to activate a first control routine comprising controlling the panel exciter at a first frequency for a predetermined period of time. In response to the detection of the foreign material and the temperature below the predetermined threshold, the controller is configured to activate a second control routine.

In the second control routine, the controller is configured to activate the heating apparatus for a heating duration and activate the panel exciter at a second frequency. Following the panel excitation, the controller may verify the detection of the foreign material. In response to the foreign material detected in the verified detection, the controller may continue to activate the panel exciter at a third frequency. The third frequency is greater than the second frequency. The embodiments of the third aspect of the disclosure can include the controller configured to identify the heating duration based on the temperature.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
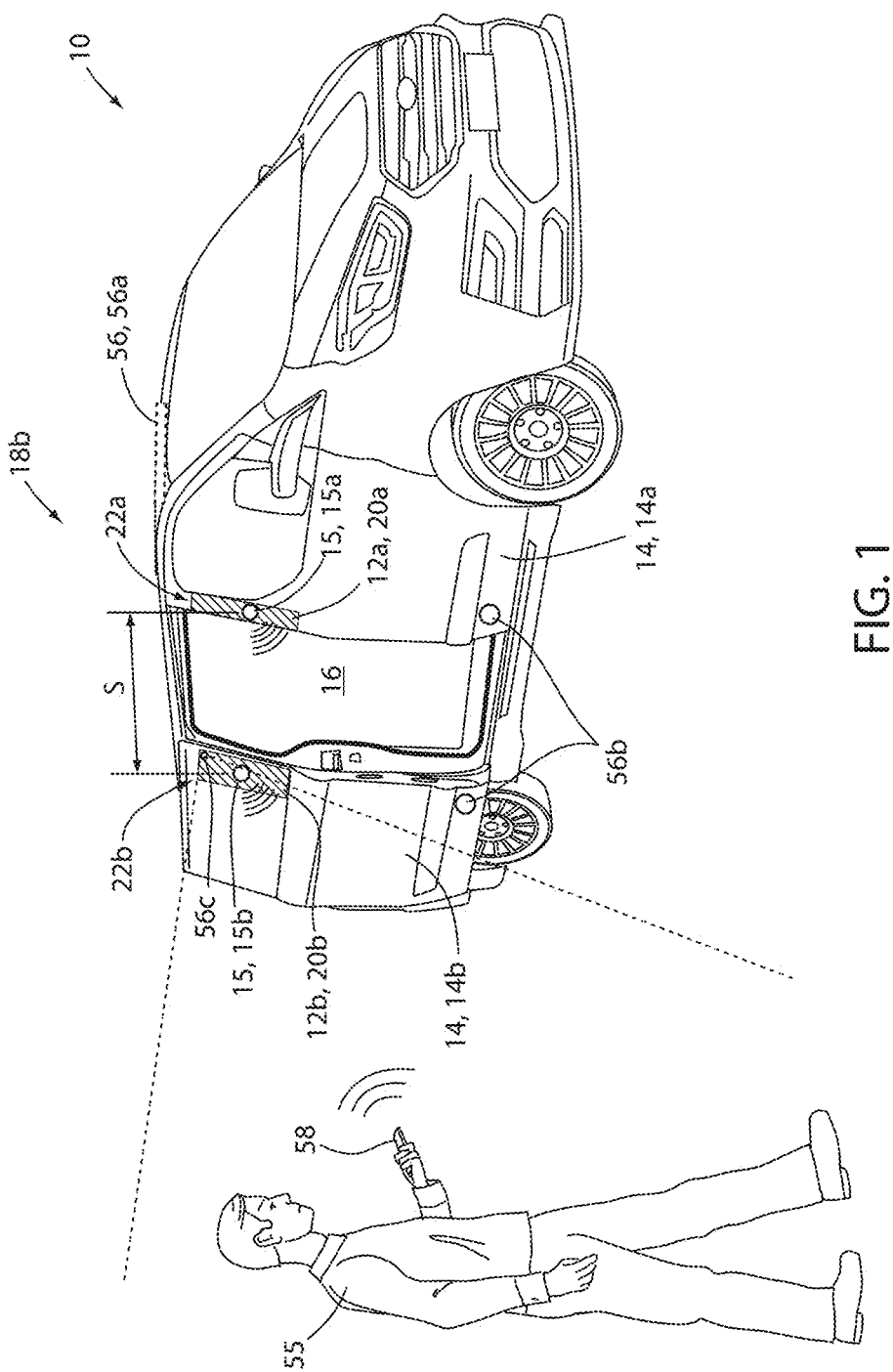
FIG. 1 is a projected view of a passenger approaching a vehicle.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring to FIG. 1, a projected view of a vehicle 10 comprising a display apparatus 12 in connection with an exterior panel. The display apparatus 12 may comprise a first display portion 12a and a second display portion 12b. The display portions 12a and 12b may correspond to video display panels that may be controlled by a controller to operate independently or together in combination. The display portions 12a and 12b may be in connection with at least one door 14 of the vehicle 10. Accordingly, at least one of the first display portion 12a and the second display portion 12b may be in connection with the at least one door 14 such that the display portions 12a and 12b may move based on the position of the at least one door 14. In this way, the display apparatus 12 may provide for the display of various graphics, video or image data, as well as a touch screen interface to provide a variety of beneficial operations related to the vehicle 10.

As provided in various implementations, the disclosure provides for the display apparatus 12 to include one or more audible devices, which may correspond to panel exciters 15. As discussed herein, the panel exciters 15 may correspond to various electrically controlled vibrational devices. In an exemplary embodiment, the panel exciters 15 may correspond to frequency controlled electro-acoustic exciters, panel speakers, or similar electro-vibrational devices. The panel exciters 15 may be incorporated with, or otherwise in connection with, the vehicle 10 corresponding to each of the display portions 12a and 12b. As provided by the following detailed description, the panel exciters 15 may be applied in a variety of ways to improve the accessibility and operation of the vehicle 10.

In some embodiments, a controller of the display apparatus 12 may be configured to control the exciters to output audio instructions or tones that may provide instructions to passengers boarding the vehicle 10. In an exemplary embodiment, the exciters may additionally be controlled to output directional tones or sounds providing an audible indication identifying a location of an entrance or opening 16 for accessing a compartment of the vehicle 10. For example, when the at least one door 14 is open, the controller may output audible tones or notifications from a first panel exciter 15a on the at least one door 14 in combination with tones or notifications from a second panel exciter 15b to indicate a spatial separation between the panel exciters 15a, 15b. The separation of the panel exciters 15 in combination with the tones may audibly designate a location and extent of the opening 16. In this way, the display apparatus 12 or related accessories of the vehicle 10 may be configured to output a notification to assist passengers entering the vehicle 10.

In some embodiments, the panel exciters 15 may be utilized to remove contaminants or foreign substances from a display surface of the display apparatus 12. For example, in various implementations, the display apparatus 12 may be exposed to moisture or foreign material (e.g. rain and snow) during the operation of the vehicle 10. Such exposure may lead to a buildup of contaminants on the display screen resulting in limited visibility as well as potentially diminished operation of the display apparatus 12 as a user interface as discussed herein. Accordingly, the controller of the display apparatus 12 may be configured to selectively activate the panel exciters 15 to generate vibrations configured to dislodge or remove foreign material from the display surface of the apparatus 12. In some embodiments, the control routine for the panel exciters 15 may be controlled based on temperature or additional conditions that may vary based on the ambient conditions to which the vehicle 10 is exposed. Detailed examples of the display apparatus 12 and related aspects of the vehicle 10 are discussed further in reference to exemplary systems described herein.

Figure 2A:
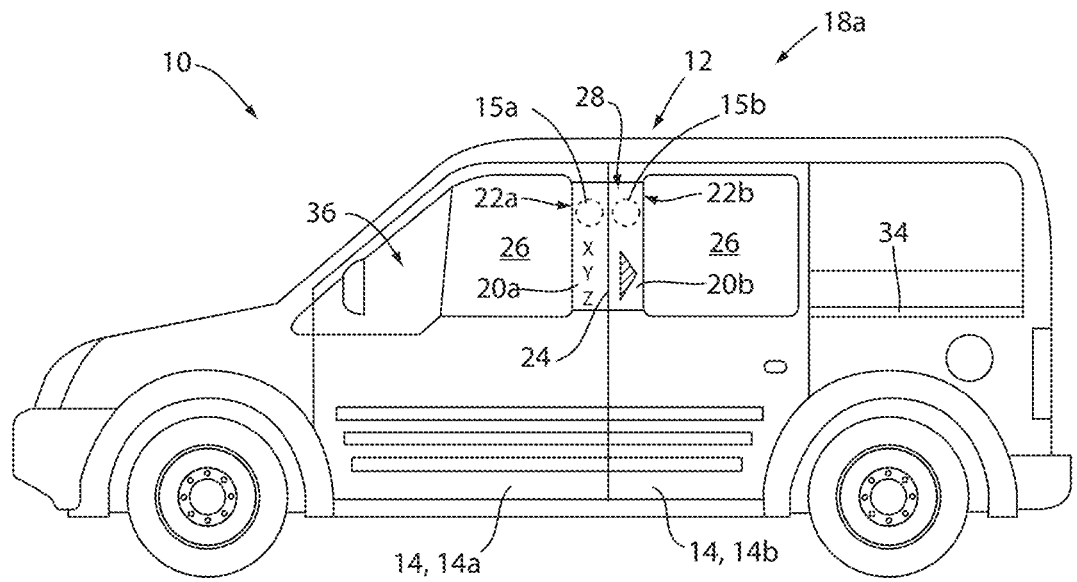
FIG. 2A is a side profile view of a vehicle comprising a display apparatus disposed on a door oriented in a closed position.
Figure 2B:
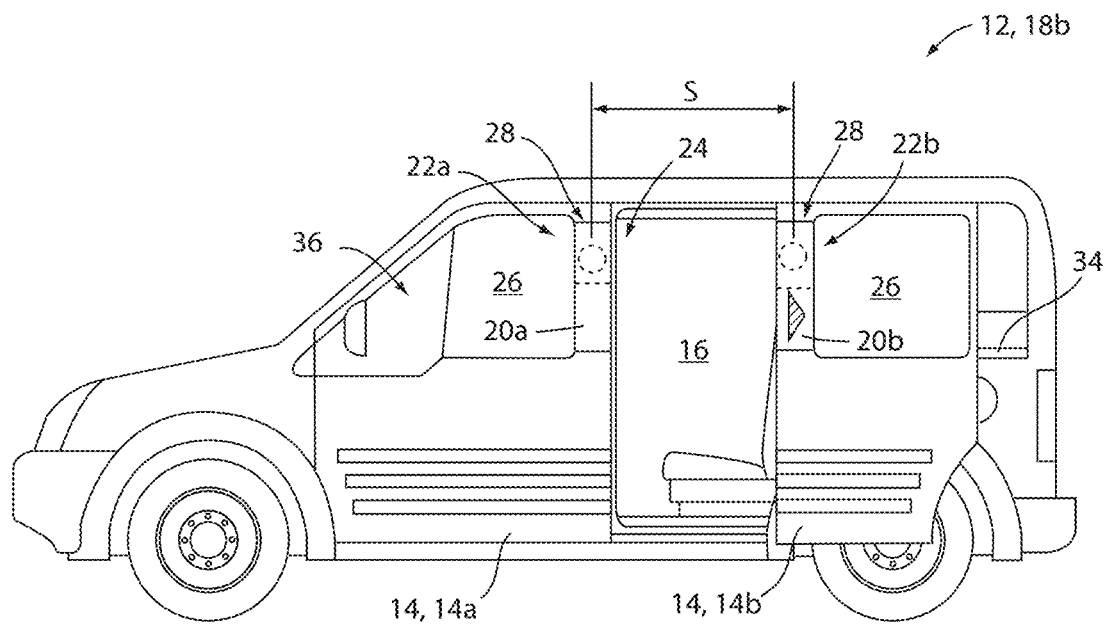
FIG. 2B is a side profile view of a vehicle comprising a display apparatus disposed on a door with the door oriented in an open position.

FIGS. 2A and 2B demonstrate a side profile view of a vehicle 10 comprising a display apparatus 12 shown demonstrating the at least one door 14 oriented in a closed position 18a and an open position 18b, respectively. Referring now to FIGS. 1, 2A, and 2B, as previously discussed, in various embodiments, the display apparatus 12 may comprise a plurality of display portions 12a and 12b that may correspond to independent display panels 20. The display panels 20 may comprise a first display panel 20a and a second display panel 20b, which may be in connection with and/or form a first door trim portion 22a and a second door trim portion 22b, respectively. The door trim portions 22a, 22b may be disposed along a perimeter edge 24 formed between a first door 14a and second door 14b. In this configuration, the perimeter edge 24 may form a first boundary of each of the display panels 20 along a first side. Additionally, a window 26 disposed in one or more of the vehicle doors 14 may form a second boundary of the display panels 20 along a second side. The display apparatus 12 may provide for each of the display panels 20 to be controlled both independently and in combination to provide and display a variety of visual effects.

As demonstrated in FIG. 2A, in the closed position 18a, the display panels 20 may be arranged contiguously side-by-side with the perimeter edge 24 forming a narrow boundary therebetween. In this configuration, a controller of the display apparatus 12 may be configured to display visual information 28 contiguously over the first display panel 20a and the second display panel 20b as illustrated and later discussed in reference to FIG. 4. Additionally, the controller of the display apparatus 12 may be configured to independently display the visual information 28 on either the first display panel 20a and/or the second display panel 20b selectively. As described herein, the visual information 28 may correspond to image data, video data, graphics and/or rendered graphic data, which may be derived from a variety of sources (e.g. cameras, imagers, stored image or graphic data, and/or dynamically rendered). In this way, the display apparatus 12 may be configured to flexibly display the visual information 28 on one or more of the display panels 20 to provide flexible operation of the display apparatus 12 to suit a variety of applications. The controller of the display apparatus 12 is discussed in further detail in reference to FIG. 6.

As demonstrated in FIG. 1B, when the at least one door 14 (e.g. the second door 14b) is arranged in the open position 18b, the display panels 20 may be spatially divided over a door opening 16 disposed along the perimeter edge 24. In this configuration, the controller of the display apparatus 12 may still operate each of the display panels 20 independently and/or in combination. For example, the controller of the display apparatus 12 may control each of the display panels 20 to sequentially display information that may emphasize or demonstrate motion of one or more of the first door 14a or the second door 14b. Additionally, the spatial separation S over the door opening 16 disposed between the doors 14 may be applied by the controller to emphasize an apparent viewing region (i.e. a space occupied by the display panels 20). Similarly, the controller may independently control portions of each of the display panels 20 such that the display apparatus 12 illuminates in a variety of patterns or sequences displayed on each of the portions independently. In this way, the display apparatus 12 may provide for flexible operation of each of the display panels 20 in the closed position 18a, the open position 18b, and intermediate positions therebetween.

As demonstrated in the exemplary embodiments, the first door 14a may be a conventional hinge-mounted door and the second door 14b may be a sliding door configured to glide along a track 34. In this configuration, the second door 14b may be arranged adjacent to the first door 14a and be configured to translate along the track 34 to arrange the display panels 20 in side-by-side on an exterior surface 36 of the vehicle 10. In this way, the disclosure may provide for the display apparatus 12 to be implemented in a variety of configurations on the vehicle 10. Though described as a sliding door and a hinge-mounted door, each of the doors 14 herein may be implemented in a variety of configurations without departing from the spirit of the disclosure.

Figure 4:
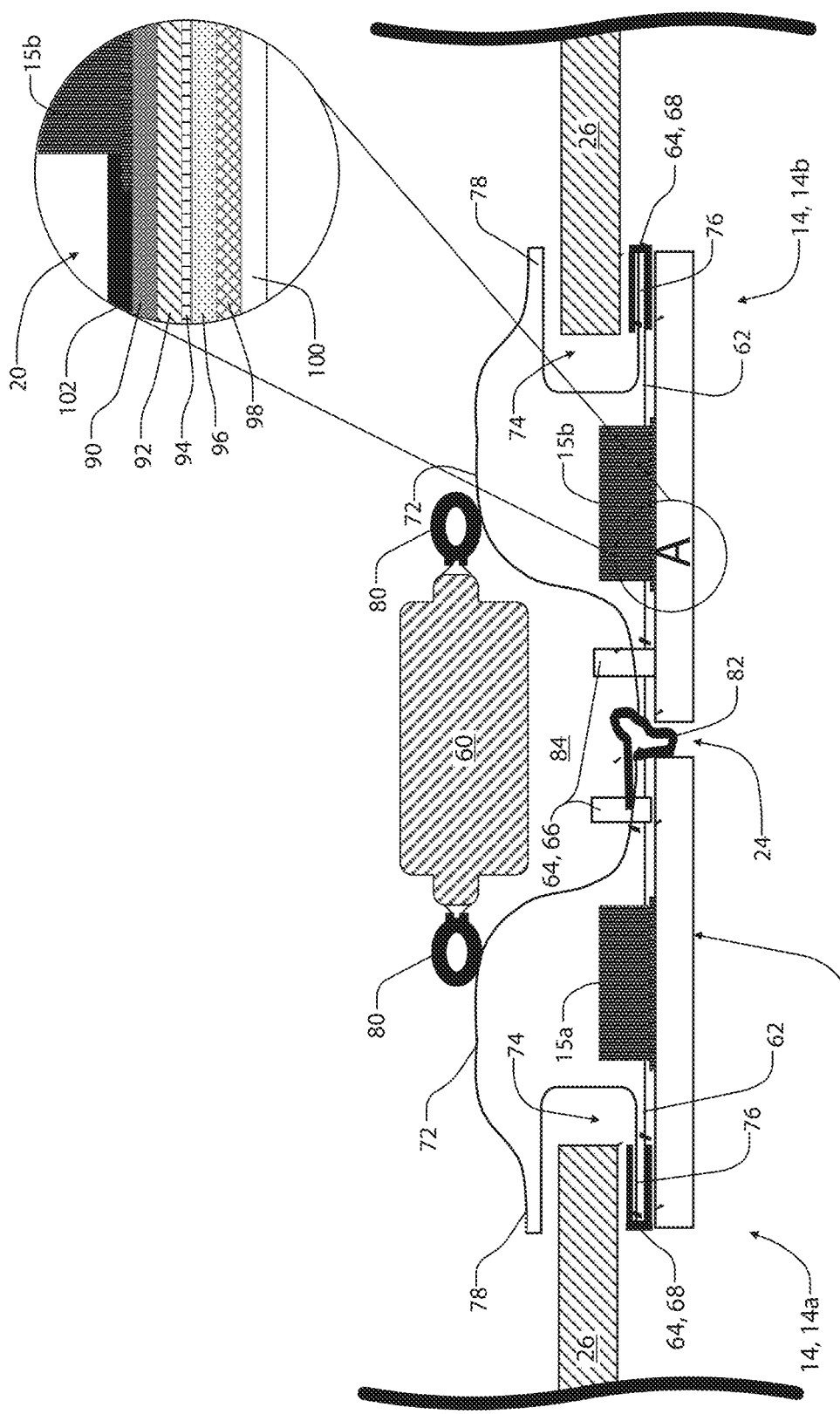
FIG. 4 is a top cross-sectional view of a display apparatus in connection with a plurality of doors of a vehicle.

Still referring to FIGS. 1, 2A, and 2B, each of the display panels 20 may further comprise the panel exciters 15. The panel exciters 15 may be formed or coupled to the display panels such that acoustic vibrations generated by the panel exciters 15 may be effectively transmitted into one or more layers or portions in connection with the display panels 20. In this way, acoustic vibrations generated by the panel exciters 15 may be transferred into the display panels 20 resulting in the vibrations resonating over the display surfaces to clear one or more foreign materials that may otherwise collect thereon. An exemplary construction of the display panels 20 comprising the panel exciters 15 in connection with the doors 14 is shown in FIG. 4.

Figure 3:
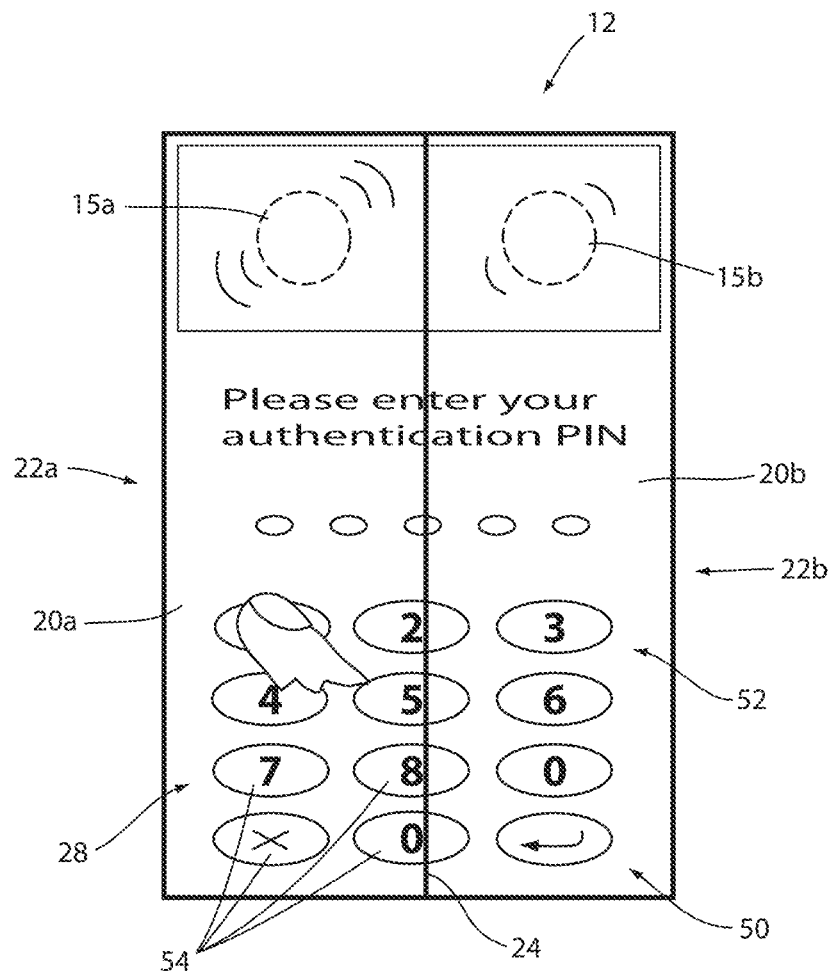
FIG. 3 is a detailed illustrative profile view of a display apparatus disposed on a plurality of vehicle doors.

Referring now to FIG. 3, in some embodiments, the display apparatus 12 may be configured to operate a user interface 50. For example, in some embodiments, the display apparatus 12 may comprise one or more touch or proximity sensors configured to identify a location of an object in proximity to a display surface 52. In such configurations, the controller of the display apparatus 12 may generate and/or present a plurality of virtual inputs 54 which may be programmed to control one or more operations of the doors 14 and/or various systems of the vehicle 10 in response to the detection of a proximate object. In operation, the display apparatus 12 may display the virtual inputs 54 based on one or more operating conditions of the vehicle 10 and/or ambient conditions of the environment proximate the vehicle 10. For example, the controller of the display apparatus 12 may display the virtual inputs 54 in response to the vehicle 10 being engaged in a park configuration. Additionally, in response to detections communicated by one or more sensors (e.g. a rain sensor, ambient light sensor, windshield wiper activation, etc.), the controller of the display apparatus 12 may selectively display the virtual inputs 54 to avoid unintentional inputs that may result from rain or various foreign objects or materials coming in contact or proximity with the display surface 52. Accordingly, the display apparatus 12 may be configured to operate in a variety of environments and provide a variety of beneficial functions to control the doors 14 and/or various systems of the vehicle 10.

As shown in FIG. 1, in an exemplary embodiment, the controller of the display apparatus 12 may be configured to control the panel exciters 15 to output a variety instructions or notifications. For example, in reference to the controller controlling the second door 14b (e.g. the sliding door) to close, the controller may output an audible message from the panel exciters 15 stating, "Vehicle door is closing, stand clear." In this way, the display apparatus may provide for improved ease of use to a person 55 approaching the vehicle 10 or interacting with the user interface 50. Though discussed in reference to the example of the vehicle 10 in reference to a passenger vehicle, the various aspects provided by the disclosure may be applied in a variety of valuable applications.

In some embodiments, the controller may further be configured to detect a proximity of an approaching patron or occupant, referred to herein as the person 55 for clarity. In order to detect the proximity of the person 55, the controller may be in communication with one or more proximity sensors 56. The proximity sensor(s) 56 may correspond to a wireless communication interface 56a (e.g. Bluetooth™, Bluetooth™ Low Energy, etc.) in communication with a mobile device 58 (e.g. a key fob, cellular device, etc.). In such examples, the proximity sensor 56 may be configured to identify the proximity of the mobile device 58 via a position (e.g. global position location) communicated from the mobile device 58 and/or based on a timing or signal property communicated to the communication interface 56a. In this configuration, the controller may be configured to identify a proximity or approach distance of the person 55 relative to the vehicle 10. The communication interface 56a is further in reference to FIG. 6.

In some implementations, the proximity sensor 56 may correspond to a reflected signal range detection device (e.g. laser proximity sensor, radar proximity system, ultrasonic proximity detector 56b, etc.). In such examples, the proximity sensor 56 may correspond to one or more driver assistance or navigational sensors. Further, in some implementations, the proximity sensor 56 may comprise one or more imagers or cameras 56c configured to identify the person in a field of view. Accordingly, the proximity sensor 56 may be implemented in a variety of ways without departing from the spirit of the disclosure. In various aspects, the proximity sensor 56 may be in communication with the controller and operable to detect an approaching person 55 or occupant of the vehicle 10. Further aspects of the controller and the proximity sensor 56 are discussed in reference to FIG. 6.

Based on the proximity of the person 55 indicated by the proximity sensor 56, the controller may adjust a volume of the sound output from the panel exciters 15. For example as the controller detects the person 55 approaching the vehicle 10, the controller may decrease an initial volume proportionate to the distance of the person 55. In this way, when the person 55 is far from the vehicle 10, the volume may be louder than when the person 55 is near the vehicle 10, such as when interacting with the user interface 50. Accordingly, the controller of the panel exciters 15 may be configured to adjust the volume output from the system based on the proximity of the person 55.

As shown in FIGS. 1 and 2B, the controller may be configured to output directional tones or sounds providing an audible indication identifying a location of the opening 16 providing the entrance to the vehicle 10. Such operation may be particularly beneficial to provide spatially distinct indications of the location of the opening 16 to those who may be visually impaired or visually distracted. For example, when the second door 14b is moved from the closed position 18a to the open position 18b, the controller may output audible tones or notifications from the first panel exciter 15a and the second panel exciter 15b indicating the spatial separation S forming the opening 16. The tones or audible indications may be staggered or alternate between the first panel exciter 15a and the second panel exciter 15b in order to emphasize the effective indication of the spatial separation S. In this way, the controller may be configured to output audible indications identifying the opening 16 as an access region to access the passenger compartment of the vehicle 10.

The controller may further be in communication with the mobile device 58 via a wireless communication interface 56a. In this way, the controller may be configured to receive one or more user settings or indications of preferred operating modes of the vehicle 10. For example, in response to the controller identifying that the person 55 is visually impaired, the controller may activate the panel exciters 15 to identify the opening 16 as discussed herein. Similarly, if the person 55 has a hearing impairment, the controller may identify a desired volume level indicated via the communication with the mobile device 58. In response to the identification of the desired volume level, the controller may adjust the volume level of the audible tones output from the panel exciters 15. In this way, the system may be provided for various custom settings that may improve the accessibility and convenience of boarding the vehicle 10 and interacting with the display apparatus 12.

Referring now FIG. 4, exemplary structural details of the display apparatus 12 are discussed in reference to a cross-sectional view of the first door 14a, the second door 14b, and a support pillar 60 (e.g. a B-pillar) disposed therebetween. Additionally, detailed section A of FIG. 4 demonstrates a cross section of the display apparatus 12, which may be formed by a plurality of layers as shown. As demonstrated in FIG. 4, each of the display panels 20 may be connected to an outer panel 62 of the door 14 via one or more connecting features 64. Additionally, the panel exciters 15 may be in connection with an interior surface of the display panels 20. The connecting features 64 may comprise one or more pins or fasteners 66, as well as hooks or clips 68, which may be in connection with one or more portions of outer panel 62. In this configuration, the display panels 20 forming the display apparatus 12 may connect to an outer surface of the outer panel 62 for incorporation on the exterior of the vehicle 10.

In some embodiments, the doors 14 may be formed by an inner panel 72 in connection with the outer panel 62 with the panel exciters 15 enclosed therebetween. Additionally, between the inner panel 72 and the outer panel 62, a glass channel 74 may be formed between an outer weld flange 76 and an inner weld flange 78. Each of the windows 26 of the doors 14 may be configured to slide open and closed guided along the glass channel 74. In the closed position 18a, as shown, the inner panel 72 of each of the doors 14 may be in contact with a door seal 80, which is further in connection with the support pillar 60. The support pillar 60 may extend along the perimeter edge 24 and the door seals 80 may be configured to prevent infiltration into a passenger compartment of the vehicle 10. Finally, in some embodiments, a margin seal 82 may be disposed between the first display panel 20a and the second display panel 20b along the perimeter edge 24. The margin seal 82 may be in connection with the perimeter edge 24 of one or more of the first door 14a, the second door 14b, the first display panel 20a, and/or the second display panel 20b. In this configuration, the margin seal 82 may provide for a protective cushion between the display panels 20 and also limit the infiltration of materials into a door jamb 84 extending between the doors 14 of the vehicle 10.

Still referring to FIG. 4, and, more specifically, to detail section A, a detailed cross-sectional view of a display panel 20 of the display apparatus 12 is shown. As previously discussed, each of the display panels 20 may be formed by a plurality of stacked layers. In an exemplary embodiment, the layers may comprise a backing shell 90, which may be formed of a heat conductive material. For example, in some embodiments, the backing shell 90 may be formed of a thermally conductive plastic or polymeric material, which may be conductively connected to the outer panel 62 of the door 14. In this configuration, excess heat that may be generated by a backlight layer 92 may be conducted outward through the backing shell 90 and into a material forming the outer panel 62 (e.g. a metallic material forming the frame of the vehicle 10). In this way, the display apparatus 12 may be configured to conduct heat outward into one or more panels of the vehicle 10 to dissipate unnecessary and/or potentially damaging heat.

As previously discussed, the backlight layer 92 may be adjacent to and/or in contact with the backing shell 90. The backlight layer 92 may comprise a plurality of LEDs or other highly efficient light sources distributed over the display surface 52 of each of the display panels 20. The light sources of the backlight layer 92 may be configured to directly emit a generated light outward from the backlight layer 92 in a direct lighting configuration. In this way, the display apparatus 12 may maximize a brightness of the visual information 28 displayed on the display panels 20 such that the display apparatus 12 may function in a wide range of ambient lighting conditions (e.g. dark ambient lighting conditions to direct sunlight conditions).

In operation, the controller of the display apparatus 12 may control the backlight layer 92 to direct the generated emission of the light outward into a liquid crystal display layer 94. The display apparatus 12 may selectively transmit the light generated by the backlight layer 92 through the liquid crystal display layer 94 outward into one or more of a heater layer 96, a touch sensor layer 98, and/or a protective layer 100. In this configuration, the display apparatus 12 may provide for each of the display panels 20 to form robust display screens, which may be controlled to not only display the visual information 28, but, also, provide for the user interface 50 and various additional beneficial features as discussed herein.

The heater layer 96 may be implemented as a thin film comprising a plurality of heater strips which may be formed by indium tin oxide (ITO), a conductive film or ink (PDOT), and or various other suitable materials. The touch sensor layer 98 may be implemented as a capacitive sensor or various other forms of proximity sensors and may form a matrix of detection regions distributed over the display surface 52 of each of the display panels 20. Finally, the protective layer 100 may correspond to a scratch and/or impact resistant glass or similar transparent material (e.g. Gorilla® glass, Willow® glass, etc.) and may comprise one or more coatings configured to prevent dust and/or contaminant buildup (e.g. a titanium dioxide coating). Accordingly, as discussed herein, the display panels 20 of the display apparatus 12 may provide for a highly effective visual display that may be operable to provide various user interface functions and communicate visual information from the exterior of the vehicle 10.

In some implementations, the panel exciters 15 may be in connection with or dynamically coupled to the interior surface of the display panels 20. In an exemplary embodiment, the panel exciters may be securely coupled to the display panel 20 via an overmolded binding layer 102. The binding layer 102 may be configured to couple the panel exciters 15 to the display panels 20 such that the vibrations generated by the panel exciters 15 are efficiently transferred into the display panels 20. For example, the overmolded binding layer 102 or other connection means may be utilized to dynamically couple the panel exciters 15 to the display panels 20. In this way, the disclosure may provide for improved operation of the surface clearing vibrations generated by the panel exciters 15 as further discussed in reference to FIGS. 5A and 5B.

Figure 5A:
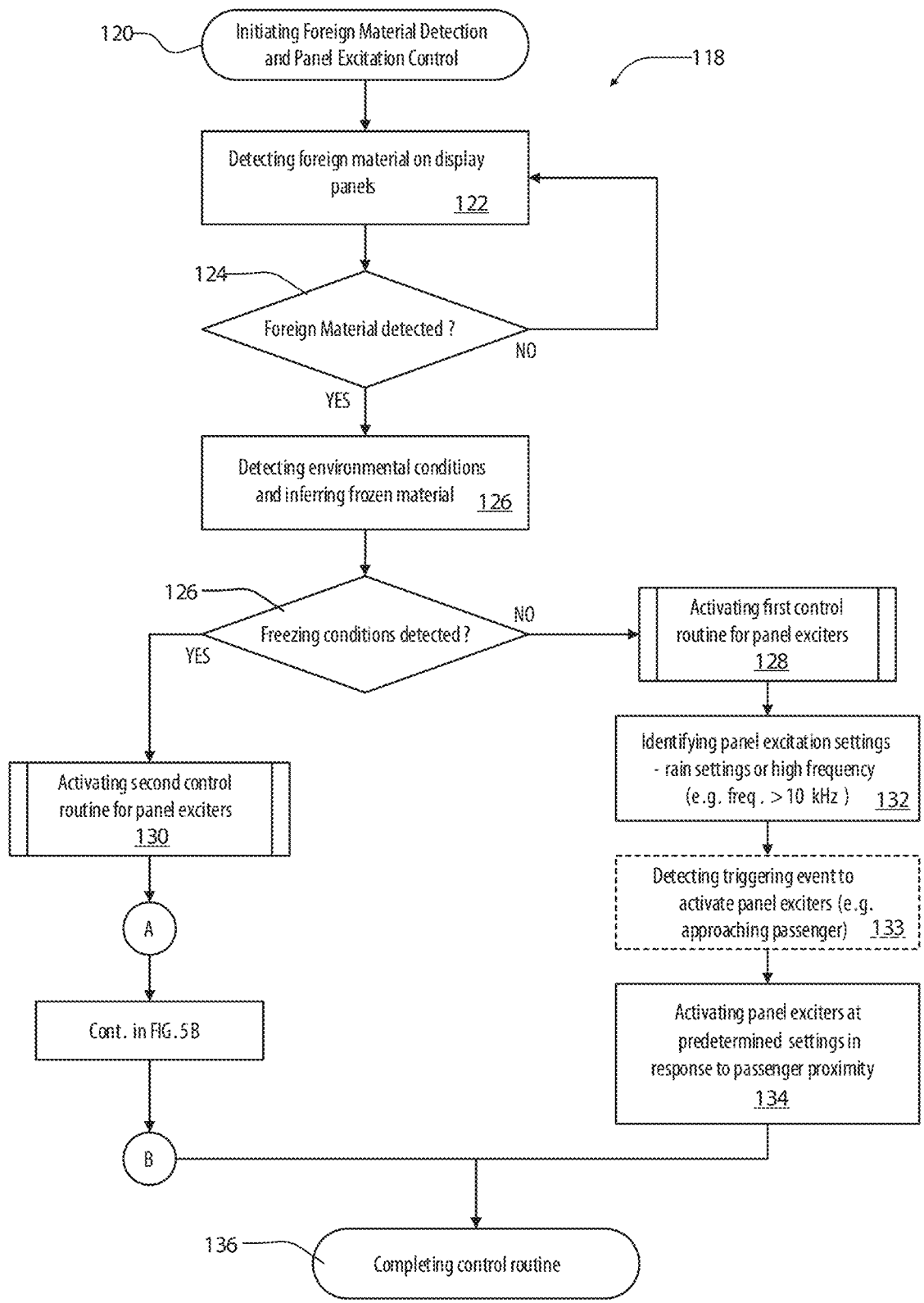
FIG. 5A is a flow chart demonstrating a method for controlling a removal procedure for removing a contaminant from a display apparatus.
Figure 5B:
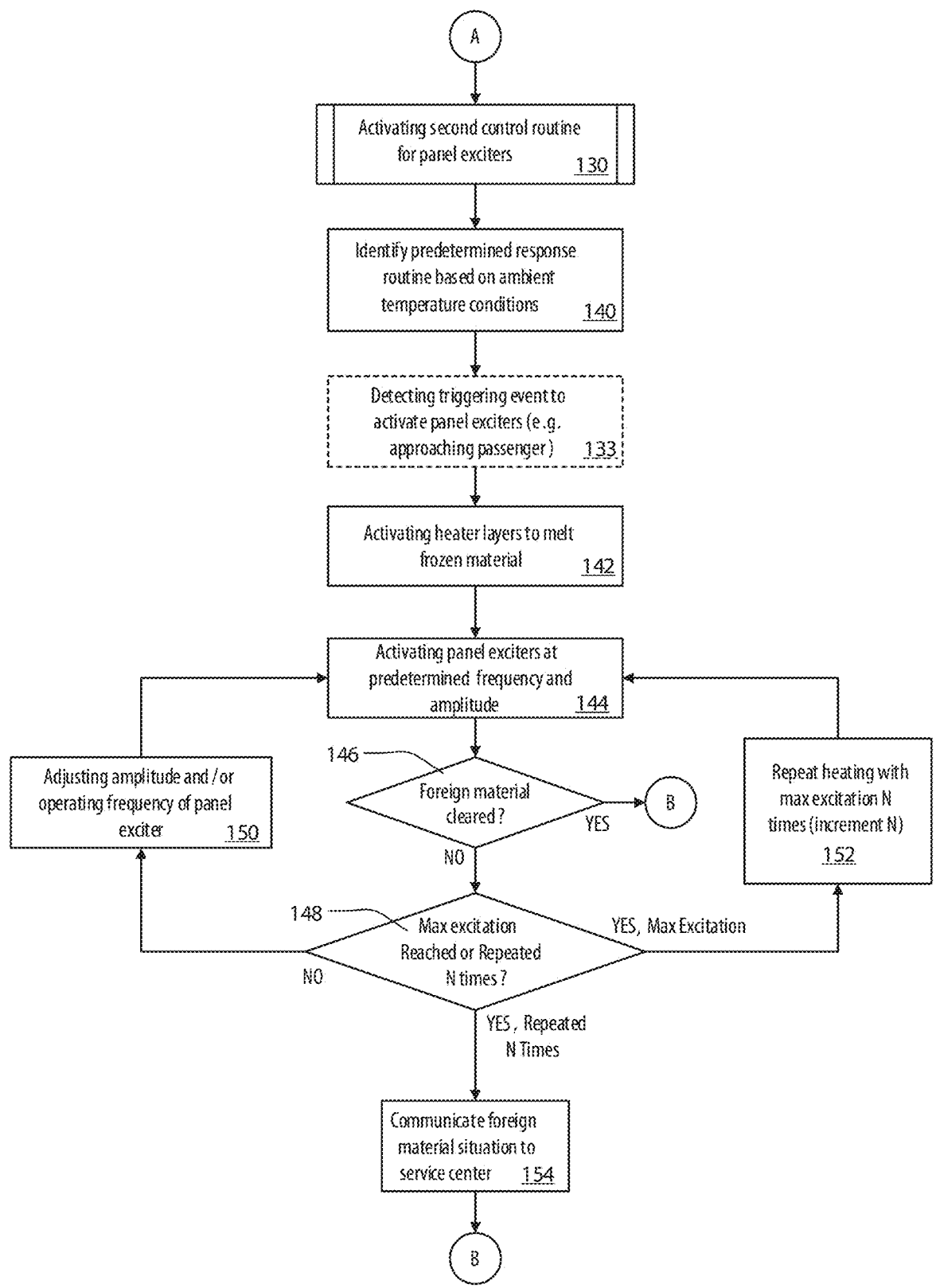
FIG. 5B is a flow chart demonstrating a method for controlling a removal procedure for removing a contaminant from a display apparatus continued from FIG. 5A.

Referring now to FIGS. 5A and 5B, a flow chart is shown demonstrating a method 118 for controlling the display apparatus 12. The method 118 may begin in step 120 by initiating the display apparatus 12 in response to one or more operating conditions of the vehicle 10. The method 118 may continue by supplying visual data to one or more of the first display panel 20a and the second display panel 20b. Throughout operation, the method 118 may provide for the detection of one or more foreign materials on or in contact with one or more of the display panels 20 (122). In step 124, the controller may be configured to detect the foreign material on or in contact with the display surface 52 of the display panels 20 based on a signal supplied by the touch sensor layer 98 (e.g. a capacitive sensor layer disposed in the display panels 20). In response to such a detection, the method 118 may detect one or more environmental conditions to make an inference as to whether or not the foreign material on the display panel 20 is frozen (126). Though discussed in reference to touch sensor layer 98 of the display panels 20, the controller may also or alternatively infer that the foreign is on the display surface based on an indication via a rain sensor of a vehicle windshield wiper system or various sensors of the vehicle 10.

The inference or determination as to whether or not the foreign material on the display panel 20 is frozen may be identified by the controller based on a temperature, humidity, or various conditions proximate to the vehicle 10. The controller may be configured to identify the environmental temperature based on a signal communicated by one or more temperature sensors, which may be incorporated as integral components of display apparatus 12 or otherwise in communication with the display apparatus 12 (e.g. via a communication bus of the vehicle 10). In this way the controller may monitor the display panels 20 for foreign materials and infer a state of the materials based on the environmental conditions in which the vehicle 10 is operating. Additional aspects of the controller, communication bus, and various other aspects of the vehicle 10 are further discussed in reference to FIG. 6.

Based on the environmental conditions detected in step 124, the controller may proceed to step 126 and select a first control routine 128 in response to non-freezing conditions or select a second control routine 130 in response to freezing conditions. In an exemplary embodiment, the freezing conditions may be determined in step 126 if the environmental temperature is below a predetermined threshold. The first control routine 128 may be initiated based on excitation settings for the panel exciters 15, which may be accessed in a memory in step 132. For example, the controller may access a control table or routine based on the environmental conditions in step 132 to identify a predetermined setting (e.g. frequency, magnitude, pulse timing etc.) of the panel exciters that is optimized to remove the foreign material based on the detected temperature. Once the excitation settings are identified, the controller may selectively activate the panel exciters to remove the foreign material with the predetermined settings that are best suited for operation (134).

Additionally, in some embodiments, the controller may control a timing of the activation of the panel exciters based on one or more triggering events (133). Following the operation of the panel exciters 15, the first control routine 128 may be concluded, which may further complete the method 118 (136). In response to the freezing conditions detected in step 126, the controller may be configured to select a second control routine 130. The second control routine 130 is discussed further in reference to FIG. 5B, which is discussed in further detail following a brief discussion of the triggering events mentioned in step 133.

The triggering events discussed in reference to step 133 may correspond to various operations of the vehicle 10, the display apparatus 12, a proximity of the person 55, and various operating aspects of the systems and devices discussed herein that may be identified by the controller. For example, the controller may be configured to activate an operation of the panel exciters 15 in response to a stoppage of the vehicle 10 or a planned stop identified based on a predetermined navigation path (e.g. a passenger pickup location identified from a navigation system). Additionally, the controller may be configured to activate an operation of the panel exciters 15 in response to a detection of an approaching person 55. As previously discussed, the controller may be configured to identify the approaching person 55 based on the proximity of the person 55 indicated by the proximity sensor 56. Accordingly, the controller may be configured to activate the panel exciters in response to the person 55 within a first predetermined distance. In this way, the controller may complete the operation of the panel exciters 15 prior to the person 55 reaching a second predetermined distance or viewing distance of the vehicle 10 based on normal walking speeds.

For example, the predetermined distance may be approximately 2-10 meters of the vehicle 10 and an average walking speed may be approximately 1-2 meters per second. Accordingly, in response to the person 55 detected by the proximity sensor 56 at a first predetermined distance (e.g. approximately 20 meters) from the vehicle 10, the controller may be configured to activate the panel exciters 15 for approximately 5-15 seconds. Additionally, the controller may be configured to deactivate the panel exciters 15 prior to the person 55 reaching the second predetermined distance threshold (e.g. 2-10 meters). In this way, the controller may be configured to activate the panel exciters 15 at times when the person 55 is unlikely to notice or be bothered by audible tones that may result due to the vibrations of the display panels 20.

Referring now to FIG. 5B, the second control routine 130 is further discussed in reference to the operation of the controller in response to freezing conditions. Similar to the first control routine 128, the second control routine 130 may be initiated based on excitation settings for the panel exciters 15, which may be accessed in a memory in step 140. For example, the controller may access a control table or routine based on the environmental conditions in step 140 to identify a predetermined setting (e.g. frequency, magnitude, pulse timing etc.) of the panel exciters that is optimized to remove the foreign material based on the detected temperature. Additionally, in the step 140, the controller may access timing for an activation of the heater or heater layer 96, which may be operated by the controller in combination with the panel exciters 15. Once the excitation settings and heater activation settings are identified, the controller may further detect one or more triggering events in step 133 as previously discussed. In operation, the controller may identify the triggering events to control the panel exciters 15, the display panels, and/or the heater layer 96. In this way, the disclosure may provide for flexible operation of the various devices and systems discussed herein in various combinations.

Following step 133 in FIG. 5B, the controller may continue to activate the heater layer 96 of the display panel 20 based on a calculated or predetermined timing identified in the memory, which may be based on the temperature and other environmental conditions (142). As previously discussed, the temperature and other environmental conditions may be detected by various sensors (e.g. temperature sensors, precipitation sensors, etc.) and communicated to the controller. Additionally, the controller may initiate the panel exciters 15a, 15b based on a control setting, which may also be accessed in memory and specified via an algorithm or table in response to the temperature and other environmental conditions (144). Similar to step 132, the controller may access a control table or routine based on the environmental conditions to identify a predetermined setting (e.g. frequency, magnitude, pulse timing etc.) of the panel exciters 15. In this way the controller may activate the panel exciters 15 such that their operation will be effective to remove the foreign material.

In the second control routine 130, the controller may be configured to activate the panel exciters 15 to a plurality settings (e.g. frequency, magnitude, pulse timing etc.) that change over time. The change of the settings of the panel exciters 15 may be in response to a determination as to whether or not the foreign material is removed in step 146. The determination of whether the foreign material is cleared may be based on one or more signals communicated from the touch sensor layer 98 of the display panels 20 (e.g. a capacitive sensor layer disposed in the display panels 20). Accordingly, in response to the foreign material being cleared in step 146, the second control routine 130 may continue to step 136 via reference element B to complete the second control routine 130 of the method 118.

In response to the foreign material not being cleared in step 146 or still being detected, the second control routine 130 may continue to step 148 to identify if a maximum excitation level has been reached for the activation of the panel exciters 15. For example, the panel exciters 15 may be sequentially activated at a plurality of frequency levels, amplitudes, and/or timing intervals, which may increase in frequency, amplitude and/or duration in response to the foreign material being detected in recurring activations of the panel exciters 15. Accordingly, if the maximum excitation level is not reached in step 148, the controller may continue to step 150 to increase the amplitude, frequency, and/or time duration of the activation of the panel exciters 15. For example, the frequency of the panel exciters 15 may be increased to activate each of the following frequencies in consecutive attempts of step 144 based on the updated settings of step 150 (70 Hz, 500 Hz, 2 kHz, 4 kHz, etc.). The controller may then return to step 144 to re-initiate the panel exciters 15 based on the updated excitation settings. By increasing the excitation level of the panel exciters 15 over time, the controller may provide for operation that may be inaudible to passengers or persons near the vehicle 10 during initial attempts to clear the foreign material and only activate higher intensity or audible settings if the foreign material is not initially removed.

Alternatively, if the maximum excitation has already been reached in step 148, the controller may continue to step 152 to repeat a heating operation of the heater layer 96. Step 152 may provide for additional attempts (e.g. N attempts) to heat material that may be frozen. Following step 152, the second control routine 130 may repeat the excitation steps previously discussed in reference to steps 146, 148, and/or 150. Finally, following N attempts, the controller may identify that there is either an error in the detection of the foreign material or that the foreign material cannot be removed via the method 118. Accordingly, in step 154, the controller may communicate that the foreign material may be conflicting with operation and report the issue to a service center. Such a communication may be communicated via the wireless communication interface 56a, which may include various wireless communication protocols (e.g. cellular, WiFi, 3G, 4G, etc.). Accordingly the disclosure may provide for a robust operating routine for the panel exciters that may vary to optimize the operation in a variety of situations.

Figure 6:
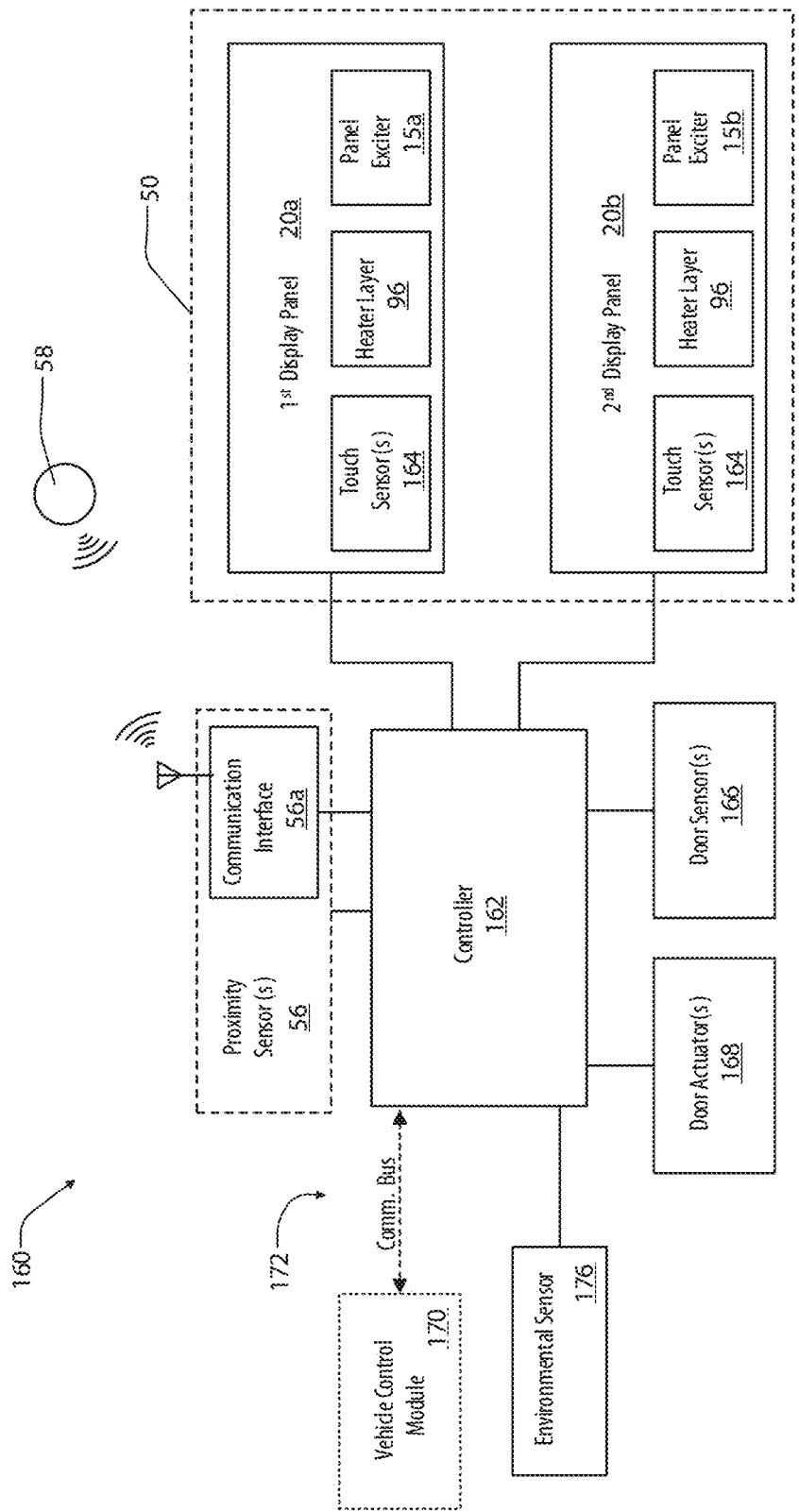
FIG. 6 is a block diagram of a system comprising a display apparatus in accordance with the disclosure.

Referring now to FIG. 6, a block diagram of a control system 160 comprising the display apparatus 12 is shown. The system 160 may comprise the controller 162 of the display apparatus 12, which may comprise one or more processors or memory devices. Such devices may include, but are not limited to, one or more circuits, processors, microprocessors, and various volatile or non-volatile memory devices. In this configuration, the controller 162 of the system 160 may provide for the various operations and routines discussed herein.

As demonstrated, the controller 162 may be in communication with each of the first display panel 20a and the second display panel 20b. The controller 162 may further be in communication with one or more touch sensors 164, which may correspond to the touch sensor layers 98 disposed in each of the display panels 20. In various embodiments, the controller 162 may also be in communication with one or more door sensors 166, door actuators 168, and/or a vehicle control module 170. In this configuration, the controller 162 may be operable to detect each of the doors 14 in the open position 18b and the closed position 18a and further control the position or motion of the doors 14 via the door actuators 168. The door actuators 168 may correspond to one or more rotational or translational actuators or motors, which may be configured to control the motion or position of each of the doors 14 as discussed herein.

In an exemplary embodiment, the controller 162 may be in communication with one or more sensors or additional vehicle systems via a communication bus 172, which may provide communication between the controller 162 and the vehicle control module 170. In this way, the user interface 50 of the controller 162 may be in communication with a variety of systems of the vehicle 10 via the vehicle control module 170. In this way, the controller 162 of the display apparatus 12 may be configured in a variety of ways to control various systems of the vehicle 10. Though specific embodiments and details of the display apparatus 12, the display panels 20, and various additional aspects of the disclosure are described in reference to specific materials and structural details, it should be understood that the detailed embodiments described herein may be combined and adapted to suit a variety of applications without departing from the spirit of the disclosure.

The controller 162 may further be configured to detect a proximity of an approaching patron or occupant, referred to herein as the person 55 for clarity. In order to detect the proximity of the person 55, the controller 162 may be in communication with one or more proximity sensors 56. The proximity sensor(s) 56 may correspond to a Bluetooth™ sensor (e.g. Bluetooth™ Low Energy) in communication with a mobile device 58 (e.g. a key fob, cellular device, etc.), a laser or radar proximity system (e.g. blind spot warning and/or lane departure signal), ultrasonic proximity detector 56b (e.g. parking sensors on various portions of the exterior of the vehicle 10), cameras 56c, etc. In various aspects, the proximity sensor 56 may be in communication with the controller 162 and operable to detect an approaching occupant of the vehicle 10.

The controller 162 may further be in communication with the mobile device 58 via the wireless communication interface 56a. The communication interface 56a may be configured to communicate via a plurality of long and/or short range communication protocols. For example, the communication protocols may correspond to a mobile data or cellular communication including, but not limited to, a cellular or broadband wireless communication and similar communication methods (e.g. GSM, CDMA, WCDMA, GPRS, WiFi, WiMax, 3G, 4G, etc.). The communication protocols may also to a radio communication interface including, but not limited to, RFID, Bluetooth™, Bluetooth™ Low Energy (BLE), ANT+, NFC, ZigBee, infrared, ultraband, etc. In this way, the controller 162 may be configured to receive one or more user settings or indications of preferred operating modes of the vehicle 10, communicate with remote servers or service centers, identify a proximity of the mobile device 58, etc. Accordingly, the system 160 may provide for flexible operation that may be implemented in a variety of ways based on the beneficial examples discussed herein.

Additionally, as discussed herein, the controller 162 may be configured to identify a temperature proximate the vehicle 10. Accordingly, the controller 162 may be in communication with a temperature sensor or environmental sensor 176 as depicted in FIG. 6. The controller 162 may monitor the temperature and environmental conditions proximate the vehicle 10 to facilitate the assessment of whether a foreign material on the display panels 20 is in a liquid or frozen form. Accordingly, in response to the temperature proximate the vehicle 10, the controller 162 may be configured to infer a condition of the foreign material and selectively apply one of a plurality of control routines 128, 130 to control the panel exciters 15.

For purposes of this disclosure, the terms "coupled" or "connected" (in all its forms, couple, coupled, or connect, connected, etc.) may refer to the direct or indirect joining together of two components (electrical or mechanical). Such joining may be stationary in nature or movable. Such joining may be achieved in that the two (electrical or mechanical) components and any additional intermediate members be integrally formed as a unitary body with one another or with the two components. Unless otherwise indicated, such bonding may be the kind of permanent or removable or releasable.

It is also important to note that the construction and arrangement is purely illustrative of the elements shown in this disclosure as the exemplary embodiments. Although only a few embodiments of the present inventions have been described in detail in this disclosure, the skilled artisan will understand that many modifications are possible (for example, variations in terms of size, dimensions, structures, shapes and proportions of the various elements, parameter values, fastening devices, use of materials, colors, position, etc.) without materially departing from the teachings and advantages of the present subject matter. For example, elements shown as a unitary body, be constructed of multiple parts or elements shown as multiple parts may be formed as a unitary body, the operation of interfaces may be varied reversed or otherwise, the length or width of the structures and/or members or connector or other elements of the system can be varied, the nature or number of adjustment positions between the elements can vary. Accordingly, all such modifications as within the scope of the present innovations are included. Other substitutions, modifications, changes and omissions made in design, are made in the operating conditions and arrangement of the preferred and other exemplary embodiments without departing from the spirit of the present innovations.

It will be appreciated that any processes or steps within the described processes with other processes disclosed or described steps can be combined to form structures within the scope of the present disclosure. The disclosed herein exemplary structures and processes are purely illustrative and should not be construed as limiting.

What is claimed is:

1. An exterior display apparatus for a vehicle comprising:
a display panel comprising a display surface in connection with an exterior portion of the vehicle;
an acoustic vibration device dynamically coupled to the display surface;
a sensor configured to detect a foreign material on a portion of the display screen; and
a controller configured to:
identify a temperature of an environment proximate the vehicle; and
in response to the detection of the foreign material, activate a plurality of vibration control routines of the acoustic vibrational device based on the temperature.

2. The apparatus according to claim 1, wherein the acoustic vibration device comprises a panel exciter in connection with display panel.

3. The apparatus according to claim 2, wherein the plurality of vibration control routines comprise:
a first routine, wherein the controller is configured to activate the first routine in response to the temperature above a freezing threshold; and
a second routine, wherein the controller is configured to activate the second control routine in response to the temperature below the freezing threshold.

4. The apparatus according to claim 3, wherein the first control routine comprises activating the panel exciter at a first frequency.

5. The apparatus according to claim 4, wherein the second control routine comprises the controller further configured to:
activate the panel exciter at a second frequency;
update a detection of the foreign material following the activation of the second frequency; and
in response to the foreign material detected in the updated detection, activate the panel exciter at a third activation frequency.

6. The apparatus according to claim 5, wherein the third frequency is greater than the second frequency.

7. The apparatus according to claim 5, further comprising a heating apparatus configured to heat at least a portion of the display surface.

8. The apparatus according to claim 7, wherein the second control routine comprises the controller further configured to:
activate the heating apparatus for a predetermined heating duration.

9. The apparatus according to claim 8, wherein the controller is configured to identify the predetermined heating duration based on the temperature.

10. The apparatus according to claim 1, wherein the controller is further configured to receive an indication from the sensor indicating a change in a signal conducted over at least a portion of the display panel.

11. The apparatus according to claim 1, wherein the sensor comprises a touch sensitive user interface configured to detect a user input to the at least one display panel.

12. The apparatus according to claim 11, wherein the controller is further configured to detect the foreign material disposed on the display panel in response to a signal from the touch sensitive user interface.

13. The apparatus according to claim 1, wherein the at least one panel comprises:
a first display panel in connection with a first door trim portion; and
a second display panel in connection with a second door trim portion adjacent to the first trim portion;
wherein each of the display panels comprises a touch sensor and a heater layer distributed over a display surface.

14. A method for controlling a panel exciter for display panel comprising:
detecting a foreign material on a display surface of the display panel;
detecting a temperature of an environment of the display panel;
in response to detecting the foreign material and the temperature greater than or equal to a temperature threshold, activating a first control routine comprising activating the panel exciter to a first frequency for a predetermined period of time; and
in response to detecting the foreign material and the temperature less than the temperature threshold, activating a second control routine comprising:
activating the panel exciter at a second frequency;
updating a detection of the foreign material following the activation of the second frequency; and
in response to the foreign material detected in the updated detection, activating the panel exciter at a third activation frequency.

15. The method according to claim 14, wherein the temperature threshold indicates a freezing condition of the environment.

16. The method according to claim 14, wherein the third frequency is greater than the second frequency.

17. The method according to claim 14, wherein the second control routine further comprises:
heating the display surface for a predetermined heating duration.

18. The method according to claim 17, further comprising:
adjusting the predetermined heating duration based on the temperature.

19. An exterior display apparatus for a vehicle comprising:
a display panel comprising a display surface and a touch screen interface in connection with an exterior portion of the vehicle;
an acoustic vibration device dynamically coupled to the display surface;
a heating apparatus configured to heat the display surface;
an environmental sensor configured to detect a temperature proximate the vehicle; and
a controller configured to:
detect a foreign material on the display screen based on a signal from the touch screen interface;
in response to the detection of the foreign material and the temperature above or equal to a predetermined threshold, activate a first control routine comprising controlling the panel exciter at a first frequency for a predetermined period of time; and
in response to the detection of the foreign material and the temperature below the predetermined threshold, activate a second control routine comprising:
activate the heating apparatus for a heating duration;
activate the panel exciter at a second frequency;
verify the detection of the foreign material; and
in response to the foreign material detected in the verified detection, activate the panel exciter at a third frequency, wherein the third frequency is greater than the second frequency.

20. The apparatus according to claim 19, wherein the controller is configured to identify the heating duration based on the temperature.

* * * * *